(No Model.)

H. P. DEUSCHER & F. J. BECKER.
FERTILIZER DISTRIBUTER.

No. 444,394.

Patented Jan. 6, 1891.

Witnesses
James E. Hancock
O. V. Parrish

Inventors
Henry P. Deuscher
Frank J. Becker
By their Attorney
Robert S. Carr

UNITED STATES PATENT OFFICE

HENRY P. DEUSCHER AND FRANK J. BECKER, OF HAMILTON, OHIO, ASSIGNORS TO THE H. P. DEUSCHER MANUFACTURING COMPANY, OF SAME PLACE.

FERTILIZER-DISTRIBUTER.

SPECIFICATION forming part of Letters Patent No. 444,394, dated January 6, 1891.

Application filed June 23, 1890. Serial No. 356,510. (No model.)

*To all whom it may concern:*

Be it known that we, HENRY P. DEUSCHER and FRANK J. BECKER, citizens of the United States, residing at Hamilton, in the county of Butler and State of Ohio, have invented certain new and useful Improvements in Fertilizer-Distributers; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in fertilizer-distributers of that class that are usually attached to corn and seed planters; and the objects of our improvements are, first, to provide a positive feed mechanism and agitator combined that will not choke nor clog; second, to provide such form of box or receptacle that its contents will not pack nor arch over the feed-cup; third, to locate the bearings of the feed-shaft from contact with the fertilizer; fourth, to cover that portion of the feed-shaft which passes through the feed-cup with non-corrosive material to prevent adhesion of the fertilizer thereto; fifth, to construct the feed-cup of a single piece of metal; sixth, to pivot the spout which depends from the feed-cup to drop the fertilizer different distances from the seed dropped by the planter; seventh, to adjustably attach the fertilizer-distributer to the planter. We attain these objects by the mechanism illustrated in the accompanying drawings, in which—

Figure 1:
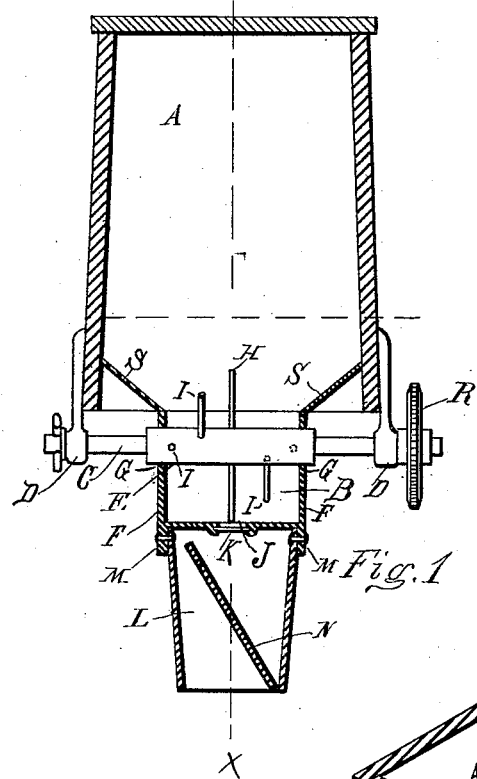
Figure 2:
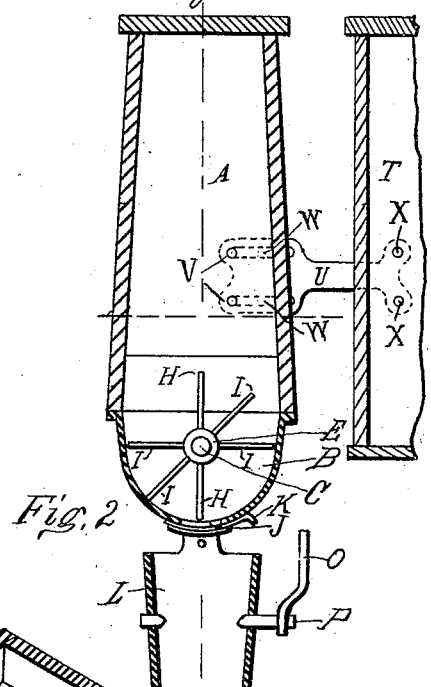
Figure 3:
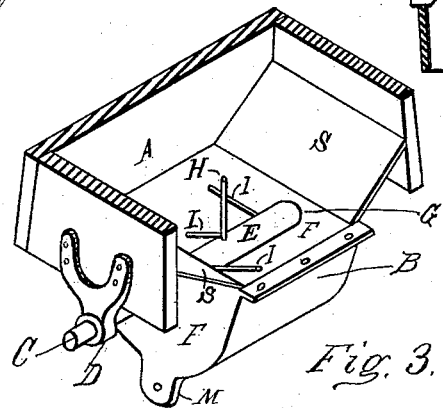

Figure 1 is a vertical section on line $z\,z$, Fig. 2, of the machine; Fig. 2, a transverse section of the same on line $x\,x$, Fig. 1, shown adjustably attached to the rear portion of a planter seed-box; Fig. 3, a perspective view of the interior of the feed-cup, showing the feeding mechanism.

A represents the box or receptacle to contain the fertilizer, its form being the frustum of a pyramid.

B is a feed-cup with semi-cylindrical bottom, constructed of a single piece of metal, attached to and forming the central portion of box A.

C is a feed-shaft passing axially through the feed-cup, and D bearings for said feed-shaft, attached to the sides of box A at a distance from the feed-cup.

E is a sleeve of non-corrosive material, preferably hard wood, surrounding shaft C within the feed-cup, and F, end walls of cup B, provided with apertures G for the passage of said feed-shaft and sleeve. H is a pin projecting through the center of said sleeve and feed-shaft half-way between walls F to retain said sleeve in place on the shaft, and whose opposite ends reach to the bottom of the feed-cup when the feed-shaft is turned, and I pins radially projecting from said sleeve within the feed-cup in the plane of helices described from pin H on opposite sides of sleeve E, partially around said sleeve in the direction of its rotation, terminating, respectively, near the end walls F of said feed-cup.

J is a central transverse opening in the bottom of cup B, through which the fertilizer passes in such quantity as may be desired by adjusting the size of said opening with sliding gate K.

L is a rectangular spout depending from lugs M, which are integral with feed-cup B. Said spout is so pivoted that its lower end may be turned forward or backward.

N is a valve centrally pivoted in spout L, which may be oscillated by arm O, attached to extension P of its axis.

R is a sprocket wheel or pinion attached to one extremity of the feed-shaft, by which rotary motion is imparted to said shaft.

S represents portions of the bottom of box A ascending outwardly from the top edges of the feed-cup walls to the sides of said box.

T shows the rear portion of the seed-box of a corn-planter to which the fertilizer-distributer is attached by means of arms U, being rigidly bolted to the sides of said seed-box at X, and extending rearwardly therefrom against the sides of box A, and there bolted, as at V, through slots W, which permits said box to be adjusted nearer to or farther from seed-box T, as desired.

Wheel R is usually driven by a chain connecting with the feed-shaft or axle of the corn-planter, thus rotating the feed-shaft with sleeve E, which carries pins H and I around within the feed-cup, their ends just passing the bottom of said cup.

The fertilizer placed in box A descends by reason of said box being formed larger at the bottom. Pins H and I in their revolutions penetrate said fertilizer and cause it to fill cup B, where it is agitated and pulverized by the action of said pins and kept moving alternately from walls F across and through opening J into spout L on valve N, to be dropped to the ground by the oscillation of said valve by arm O. Walls F have no bearing-surface at apertures G on sleeve E to become clogged with fertilizer from cup B. Bearings D for shaft C are removed from contact with the fertilizer, thus preventing interference with the rotation of said shaft in said bearings. The non-corrosive sleeve E, together with the wide spaces between the pins inserted therein, prevents the fertilizer adhering thereto or being carried over in a body in cup B. Said pins pass freely through the fertilizer to agitate and disintegrate the same thoroughly. Pin H passes directly over opening J to clear it of any obstructions and forces the fertilizer through the same. Cup B, formed of a single piece, offers no lodgment to the fertilizer to invite rust; but may be easily cleaned when not in use and its durability thereby increased. The horizontal adjustment of box A in slots W, as shown, serves to tighten the driving-chain on wheel R and locate said box to drop the fertilizer more or less near where the seed is dropped by the planter. Said box may be inclined more or less from a vertical position by said slots being larger than the bolts that pass through them. Arm O may be connected by rod or pitman to the check-rower slide of the planter to operate with said slide and drop the fertilizer from valve N simultaneously with the dropping of the seed by the planter. Said arm may be disconnected and valve N centrally fastened in spout L, when the fertilizer will pass through said spout to the ground in a continuous stream as received from opening J, instead of in hills or in bunches. By turning spout L forward or backward on lugs M, or by inclining box A more or less from a vertical position, or by both adjustments, the bottom of spout L may drop the fertilizer more or less near the spot where the seed is dropped by the planter.

We are aware that prior to our invention fertilizer-distributers have been made and attached to corn-planters, consisting of a feeding device operating in a cup attached to a fertilizer-box. We therefore do not claim such a combination broadly; but What we do claim, and desire to secure by Letters Patent, is—

1. A fertilizer-distributer provided with a spout pivoted to and depending from a feed-cup, the lower end thereof being capable of forward or backward adjustment, substantially as specified, and for the purpose set forth.

2. The combination, with a fertilizer-distributer, of arms attached thereto and longitudinally adjustable thereon, by means of which said distributer may be attached and adjusted more or less near to a corn or seed planter, substantially as described, and for the purpose set forth.

3. The combination, with a fertilizer-distributer, of arms pivotally attached thereto connecting said distributer with a corn or seed planter, substantially as described, and for the purpose specified.

In testimony whereof we affix our signatures in presence of two witnesses.

HENRY P. DEUSCHER.
FRANK J. BECKER.

Witnesses:
ISRAEL WILLIAMS,
WILLIS C. JONES.